United States Patent [19]
Tibbetts et al.

[11] Patent Number: 5,424,126
[45] Date of Patent: Jun. 13, 1995

[54] THIN INORGANIC FIBERS

[75] Inventors: Gary G. Tibbetts, Birmingham; Charles P. Beetz, Ortonville; Michael G. Devour, Detroit, all of Mich.

[73] Assignee: General Motors Corporation, Detroit, Mich.

[21] Appl. No.: 810,715

[22] Filed: Dec. 19, 1985

[51] Int. Cl.⁶ ............................................. D02G 3/02
[52] U.S. Cl. .................................. 428/373; 428/408; 427/113
[58] Field of Search ...................... 428/373, 408, 911; 427/113

[56] References Cited
U.S. PATENT DOCUMENTS 4,565,684  1/1986  Tibbetts et al. .................. 423/447.3

OTHER PUBLICATIONS

Marzik, *CVD Fibers*, Metalt Ceramic Matrix Composite Processing Conference, Columbus, Ohio, Nov. 1984.
DiCarlo et al., Strength Advantages of Chemically Polished Boron Fibers Before and After Reaction w/Al, NASA TM-82806.
Tibbetts, *From Catalysis to Chemical Vapor Deposition: Graphite Fibers From Natural Gas*, Graphite Intercalation Cmpds., Nov. 1984, pp. 196-198.

*Primary Examiner*—Peter A. Nelson
*Attorney, Agent, or Firm*—George A. Grove

[57] ABSTRACT

In a preferred embodiment, an inorganic fiber having a diameter between about 1 and 10 microns is formed by chemical vapor deposition of inorganic material, such as boron, onto a carbon filament having a diameter less than about 50 nanometers.

5 Claims, No Drawings

THIN INORGANIC FIBERS

BACKGROUND OF THE INVENTION

This invention relates to refractory fibers of a type suitable for composite reinforcement. More particularly, this invention relates to refractory fibers formed by chemical vapor deposition of an inorganic sheath onto a carbon filament, which fibers preferably have a diameter less than 10 microns.

Reinforced composites may be formed of refractory fibers dispersed in a matrix that may be metal, plastic or ceramic. For example, an aluminum composite may be reinforced by boron fibers. Suitable boron fibers are produced by depositing boron onto a core such as carbon fiber or tungsten wire. Heretofore, the boron fibers typically have diameters greater than 100 microns. Such diameters are necessitated in part because of the thickness of the core, which is typically greater than 10 microns in diameter. In general, increasing fiber diameter reduces tensile strength. Also, manipulation of thick fibers, for example, for packing a mold, is rendered more difficult as a result of increased resistance to bending. Furthermore, the critical stress transfer length increases with diameter, so that thicker fibers require longer lengths for comparable reinforcement.

It is an object of this invention to provide a thin refractory fiber having a diameter less than 100 microns and preferably less than 10 microns, which fiber is formed by chemical vapor deposition of an inorganic sheath onto a microscopic carbon filament. Such thin refractory fibers exhibit increased tensile strength, facilitate processing and improve composite properties.

BRIEF DESCRIPTION OF THE INVENTION

In accordance with a preferred embodiment of this invention, a refractory fiber is manufactured by chemical vapor deposition of an inorganic material, such as boron, onto a microscopic carbon filament formed by methane pyrolysis in the presence of submicron iron particles. Suitable iron particles are dispersed on a refractory growing surface. A dilute methane gas is passed over the surface while heating at a temperature sufficient to decompose the methane. The iron nuclei react with carbon derived from the methane to grow long, thin, cylindrical microscopic carbon filaments that project from the surface. The filaments have diameters less than 50 nanometers, typically between 10 and 30 nanometers, but may be over a centimeter in length. After the carbon filaments are formed, the filaments are coated with a distinct inorganic material by pyrolysis of a suitable vaporous precursor. Nascent inorganic material deposits upon the filament surfaces to produce a fiber having a diameter of between about 1 and 10 microns. Thus, the preferred fibers of this invention are characterized by a central carbon filament having a diameter less than 50 nanometers and a circumferential sheath formed of a distinct inorganic material other than carbon. The fibers exhibit increased tensile strength and are suitable for reinforcing a composite.

DETAILED DESCRIPTION OF THE INVENTION

In a preferred example of this invention, boron fibers are formed within a cylindrical tubular, fused silica reactor having a gas inlet at one end, a gas outlet at the opposite end and a heated midsection. The midsection is enclosed within a coaxial cylindrical furnace such that the reaction ends extend therefrom for making gas line connections. The reactor inner diameter was about 21 millimeters. The midsection was about 30 centimeters in length.

The fibers are grown on a surface of a pyrolytic graphite coupon inserted into the reactor midsection. Prior to insertion, the surface was seeded by spraying with an aqueous fluid containing iron particles having diameters less than about 0.1 micron. A suitable fluid is prepared by diluting with water a particulate iron suspension commercially available from Ferrofluidics Corporation, New Hampshire, under the trade designation Ferrofluid. The coupon was heated at about 500° C. during spraying to dry the surface, depositing the iron particles. Multiple coats of the dilute fluid were applied to obtain a density of about $10^{-4}$ gram iron per square centimeter.

The coupon was inserted into the reactor midsection with the iron seeded surface exposed. The reactor was heated to 750° C. while passing an argon gas stream therethrough. A mixture of simulated natural gas and hydrogen was passed into the reactor. The simulated natural gas was composed of, by volume, 2 percent ethane, 1 percent nitrogen and the balance substantially methane. The simulated natural gas was diluted with hydrogen such that the prepyrolysis methane concentration in the mixture was about 12 volume percent. The methane-hydrogen gas flow was continued at a rate of about 11 cubic centimeters per minute for about two hours while gradually increasing the temperature to 1060° C. During this time, an abundance of microscopic carbon filaments was formed on the coupon. After purging the reactor of methane, a hydrogen gas stream containing about 40 volume percent boron trichloride was passed into the reactor at a rate of about 83 cubic centimeters per minute for about two hours. After cooling the reactor, the coupon was removed.

It was found that numerous boron fibers had formed on the coupon growing surface. The density of fibers was between 50 and 100 fibers per square millimeter. The boron fibers projected from the surface pointing in the downstream direction. The average fiber diameter was about 7 microns. Fibers were generally longer than 5 millimeters, with many longer than 1 centimeter. The fibers were deemed suitable for composite reinforcement.

In accordance with this invention, the refractory fibers are formed in a two-step process. During a first step, carbon filaments having submicron diameters, preferably less than 50 nanometers, are suitably formed by decomposing a hydrocarbon gas in the presence of submicron nuclei. Preferred filaments are formed similar to filaments useful in the manufacture of graphite fibers by the methane pyrolysis process described in U.S. patent application Ser. No. 685,046, filed Dec. 21, 1984 and assigned to General Motors Corporation, assignee of the present invention, incorporated herein by reference. In the described example, the nuclei were applied as iron particles having diameters less than 0.1 micron. Alternately, suitable nuclei may be formed by applying a ferric nitrate solution to the surface, drying and reducing the oxide residue. Nuclei may also be suitably formed from submicron magnetite particles or by decomposition of organoiron compounds, such as iron carbonyl compound.

The carbon filaments that form the fiber core may be derived from any suitable thermally decomposable hydrocarbon compound, including benzene and methane. A preferred and inexpensive source of methane for the filaments is natural gas, which contains impurities that may enhance filament formation. It is preferred to grow filaments using a hydrogen gas containing a prepyrolysis methane concentration of between about 5 and 15 volume percent. As used herein, gas concentration is designated by reference to the concentration of compound in the make-up gas prior to heating to pyrolytic temperatures, it being understood that pyrolysis reduces the concentration of the compound by producing other species. In general, filaments may be suitably formed at a temperature between 950° C. and 1200° C. A temperature in the range of 1000° C. to 1100° C. is preferred. Furthermore, the practice of this invention is not limited to maintaining a constant prepyrolysis methane concentration during the filament formation step, but may be advantageously carried out by varying the methane concentration over a suitable range to obtain optimum filament formation despite variations in temperature or other reaction conditions. Thus, the prepyrolysis methane concentration may be initially adjusted to a relatively low value and gradually increased. In an example, prepyrolysis methane concentration is initially less than nine percent and is gradually increased to a value greater than 13 percent, thereby sweeping an optimum range.

In the preferred embodiment, nascent carbon from methane pyrolysis interacts with the iron nuclei to produce filaments that sprout and grow rapidly in length. The filaments have a diameter less than 50 nanometers, and generally between 10 and 30 nanometers. This thin diameter is attributed to the kinetics of the reactions that lengthen the filaments. It has been found that the preferred conditions for growing the filaments do not significantly increase the diameter, even when continued for extended time. Alternately, the concentration of hydrocarbon in the gas stream may be increased, preferably above 25 volume percent, to thicken the filaments, prior to deposition of the inorganic sheath, as described in U.S. patent application Ser. No. 685,046. However, it is desired to minimize the filament diameter, not only to minimize the diameter of the product fiber, but also to maximize the proportion of sheath. In general, a filament diameter less than 1 micron is desired.

In a second step in the described example, boron is deposited onto a central carbon filament by chemical vapor deposition. A prepyrolysis boron trichloride concentration in hydrogen between 20 and 60 volume percent is believed to be optimum. While in the described embodiment boron trichloride was employed, other boron compounds that are thermally decomposable at elevated temperatures may be suitable, including other boron halides, diborane and decaborane. A preferred pyrolysis temperature range is between 800° C. and 1200° C. In general, a lower temperature is desired to improve distribution of nascent boron forming within the reactor.

While in the described embodiment the product fiber comprises a boron sheath, the sheath may be formed of any suitable vapor deposited inorganic material. As used herein, a distinct inorganic material refers to an inorganic substance different from elemental or graphite carbon, that is, compositionally different from the filament. The following are examples of inorganic materials that may be vapor deposited onto carbon filaments from a suitable precursor gas stream to form fibers in accordance with this invention. Silicon carbide may be deposited by pyrolysis of a mixture of silane and methane. Silicon nitride may be deposited by concurrent pyrolysis of silane and ammonia. Molybdenum silicide may be deposited from a mixture of molybdenum hexafluoride and silane. Tungsten carbide may be deposited by concurrent pyrolysis of tungsten hexafluoride and methane. Tetraboron carbide may be deposited by concurrent pyrolysis of boron trichloride and methane. Boron nitride may be deposited by concurrent pyrolysis of boron trichloride and ammonia. Aluminum nitride may be formed by concurrent pyrolysis of a trimethylaluminum and ammonia. Zirconium boride may be deposited by concurrent pyrolysis of zirconium chloride and boron trichloride. Titanium carbide may be deposited by concurrent pyrolysis of titanium tetrafluoride and methane. The reactants are preferably carried by a hydrogen gas.

While this invention has been described in terms of certain embodiments thereof, it is not intended that it be limited to the above description but rather only to the extent set forth in the claims that follow.

The embodiments of the invention in which an exclusive property or privilege is claimed are defined as follows:

1. A generally cylindrical inorganic fiber having a diameter less than 100 microns, said fiber characterized by a central carbon filament having a diameter less than 1 micron and a sheath about said filament formed of distinct inorganic material.

2. A generally cylindrical refractory fiber: having a diameter less than 10 microns, said fiber characterized by a central carbon filament having a diameter less than 50 nanometers and a vapor deposited sheath about said filament formed of a distinct inorganic material.

3. A generally cylindrical boron fiber having a diameter less than 10 microns and characterized by a central carbon filament having a diameter less than 50 nanometers and a vapor deposited boron sheath about the filament.

4. A method for forming an inorganic fiber comprising passing a hydrogen gas stream containing hydrocarbon in contact with a refractory surface comprising a submicron iron particle while heating at a temperature sufficient to decompose the hydrocarbon and to grow on said surface a microscopic carbon filament having a diameter less than 1 micron, and thereafter depositing an inorganic sheath onto said filament by passing a gas stream comprising a thermally decomposable vaporous reactant into contact with the surface bearing the filament while heating at a temperature sufficient to decompose said reactant and to deposit a distinct inorganic material onto the filament to form a fiber having a diameter less than 100 microns.

5. A method for forming a boron fiber having a diameter less than 10 microns, said method comprising passing a hydrogen gas stream containing methane in contact with a refractory surface comprising submicron iron particles while heating at a temperature sufficient to decompose methane and to grow microscopic filaments having a diameter less than 50 nanometers, and thereafter passing a gas stream comprising a thermally decomposable vaporous boron compound into contact with the surface while heating at a temperature sufficient to decompose the boron compound and to deposit nascent boron onto the filament to form boron fiber.

* * * * *